UNITED STATES PATENT OFFICE.

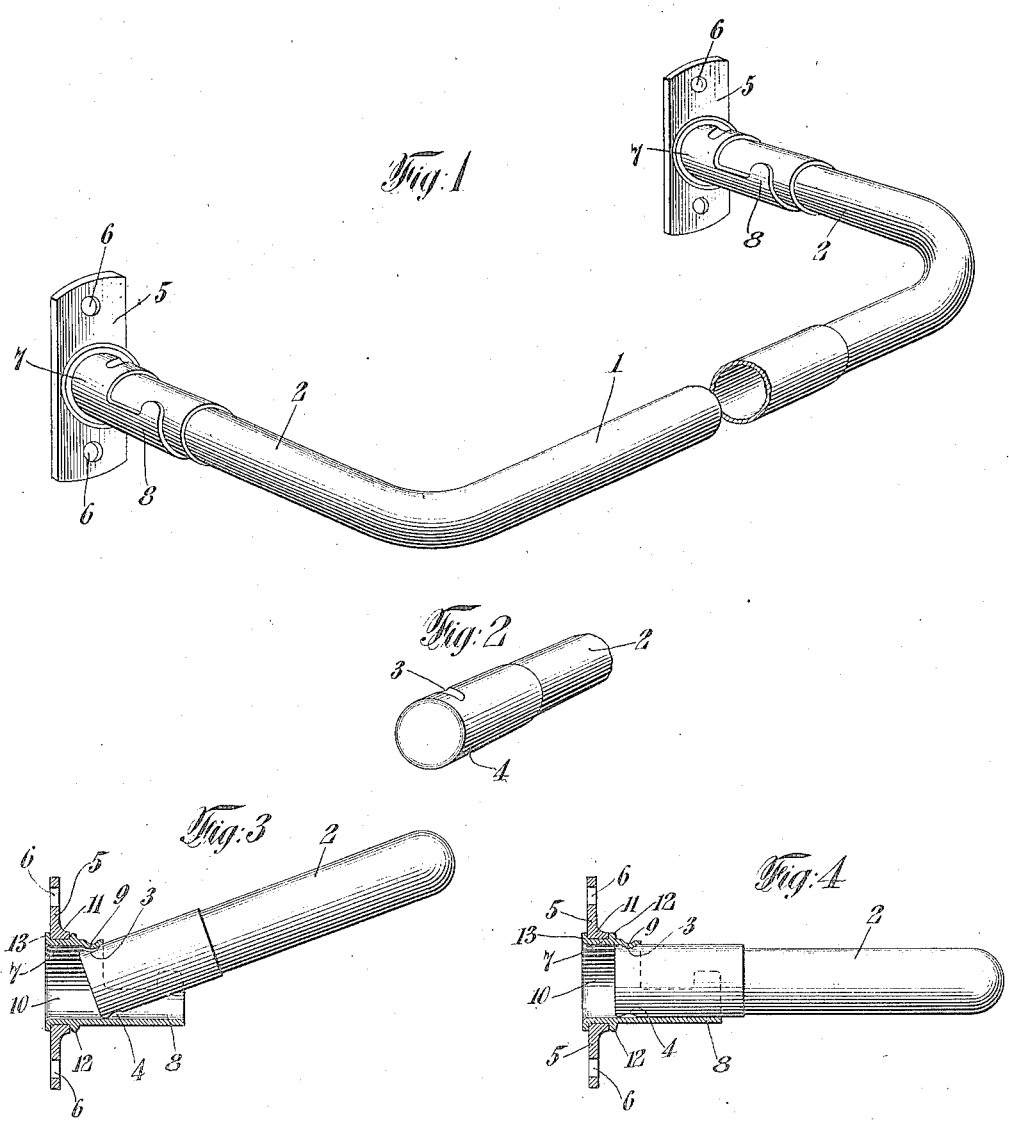

JOHN KRODER, OF NEW YORK, N. Y., ASSIGNOR TO THE JOHN KRODER & HENRY REUBEL COMPANY, OF NEW YORK, N. Y., A CORPORATION OF NEW YORK.

EXTENSION CURTAIN-ROD.

1,196,704.  Specification of Letters Patent.  Patented Aug. 29, 1916.

Application filed March 16, 1915. Serial No. 14,640.

*To all whom it may concern:*

Be it known that I, JOHN KRODER, of New York, in the county of New York, and in the State of New York, have invented a certain new and useful Improvement in Extension Curtain-Rods, and do hereby declare that the following is a full, clear, and exact description thereof.

My invention relates to an improvement in extension curtain rods, particularly that type of rod having ends which extend at right angles to the main body of the rod and is supported in horizontal position by the engagement of said ends with suitable brackets, and has for its object to provide brackets and coöperating rod-ends which will permit the ready engagement and disengagement of said rod-ends with and from said brackets.

A further object of my invention is to provide rod-ends and brackets which will be simple and inexpensive to manufacture, but sufficiently strong and durable to withstand the usage to which they are subjected.

A further object of my invention is to provide rod-ends and brackets which will be finished and attractive in appearance and thus readily marketable.

Other and further objects of my invention will be apparent from the following description of one embodiment thereof, and from an inspection of the accompanying drawings of said embodiment, in which:

Figure 1 is a perspective view of an extension rod and brackets showing the ends of said rod supported in position in said brackets; Fig. 2 a perspective view of a rod end; Fig. 3 a side view of said extension rod showing an end about to be engaged with or disengaged from its bracket, with the bracket shown in section; and Fig. 4 a view similar to Fig. 2 showing the rod in position.

Similar reference characters refer to similar parts throughout the drawings.

While I have illustrated my invention in the best embodiment thereof known to me, it is not to be restricted to such embodiment, which is to be regarded only as typical for purposes of illustration.

Referring to the drawings, an extension rod of ordinary type is shown comprising a main body portion 1 having right-angled extensions 2. Each end of the rod is provided with a depression near the end thereof, which preferably consists of a notch 3 on the top of the rod, or which may extend entirely around the rod. If a depression in the form of a notch is used, a similar notch 4 may be provided at the bottom of the rod, in order that either end of the rod may be supported in either of the brackets, although when the rod is in position the bottom notch performs no useful function. The purpose of this depression will be apparent hereinafter.

Each bracket preferably consists of a plate 5 provided with means such as screw or nail holes 6 for the ready attachment of the bracket to a wall or other place of attachment. Secured to said plate 5 in any desired manner is a socket 7 having a lower semi-circular extension 8 on which a rod-end is adapted to rest, the outer end of which extension may form spring fingers. The upper part of the socket is provided near its outer edge with an inwardly-projecting protuberance 9 which may be formed in any desired manner as by a depression in the top of the socket. Said protuberance 9 is adapted to engage the depression near the end of each rod, as notch 3 or notch 4, as the case may be, thereby holding the rod against lateral displacement when it is in horizontal position as shown in Figs. 1 and 4. The depression in the rod and inward projection on the bracket obviously may be reversed or other engaging means substituted therefor. The position of the engaging parts near the extreme end of the rod, irrespective of the form they may take, is of great assistance in preventing endwise movement of the rod, as the entire weight of the rod and whatever is hung upon it, is transmitted with increased force, due to the leverage action, at this point. The coöperating parts thus are forced together so effectively that separation in a horizontal direction is almost impossible.

A preferred construction for securing plate 5 and socket 7 firmly together is illustrated in Figs. 3 and 4. In this embodiment, an opening 10 is provided in plate 5, the edges of which are provided with a boss or extension 11, preferably extending inwardly, to form a broad bearing surface. Socket 7 is inserted in the opening until a rib or bead 12 thereon engages the front face of the boss or extension 11, and then the end of socket 7 is flanged or spun (indicated at 13) around opening 10 at the back of plate 5 to hold the socket permanently in place. This method of securing the socket and plate together not only is extremely strong, but is inexpensive, and gives the bracket a finished and marketable appearance.

Many modifications of the embodiment of my invention disclosed herein will be apparent to those skilled in the art without departing therefrom or from the scope of the claims.

Having described one embodiment of my invention, what I claim is:

1. A curtain rod bracket comprising a plate adapted to be secured to a wall and to support the end of a rod extending at right angles to the wall, said plate having a support curved in cross-section adapted to extend along the under side only of the end of a rod; the end of said support adjoining said plate being tubular in form and adapted to receive the extremity of a rod supported by said bracket and having means to engage coöperating means on the end of the rod to prevent longitudinal, outward movement thereof, said tubular portion extending throughout a part only of the length of said support.

2. A curtain rod bracket comprising a plate adapted to be secured to a wall and to support the end of a rod extending at right angles to the wall; said plate having a support adapted to extend along the under side only of the end of a rod, said bracket also having a stop and an inward projection adapted to be engaged by the upper side of the extremity of a rod, whereby the same is prevented from tipping about the end of said support as a fulcrum and from moving away from said plate.

3. The combination of a rod, the ends of which are bent so as to extend at right angles to its intermediate portion; of two brackets adapted to be secured to a wall and to support the ends of said rod, each bracket comprising a plate having a support extending along the under side only of the end of said rod; said bracket having also a stop comprising a downward projection adapted to engage a depression on the upper side of the extremity of the rod, whereby the same is prevented from tipping about the end of said support as a fulcrum and from moving away from said plate.

4. The combination of a rod, the ends of which are bent so as to extend at right angles to its intermediate portion and which ends are provided each with engaging means near the extreme end; of two brackets adapted to be secured to a wall and to support the ends of said rod, each bracket comprising a plate having a support, curved in cross-section, extending along the under side only of the end of said rod; the end of said support adjoining said plate being tubular in form and provided with means to engage said engaging means at the end of said rod when the parts are assembled, and the extremity of said rod extending into said tubular portion, said tubular portion extending throughout a part only of the length of said support.

5. The combination of a rod, the ends of which are bent so as to extend at right angles to its intermediate portion and which ends are provided each with a depression near the extremity thereof; of two brackets adapted to be secured to a wall and to support the ends of said rod, each bracket comprising a plate having a support extending along the under side only of the end of said rod and provided with spring fingers at its free end adapted to embrace said rod; the end of said support adjoining said plate being tubular in form and having an inward extension adapted to engage the depression in said rod and extending throughout a part of the length of said support, and the extremity of said rod extending into said tubular portion when the parts are assembled.

6. A rod supporting bracket comprising a member adapted to interlock with the top side of the end of the rod supported thereby and forming a pivot about which said rod and said bracket have relative movement during engagement and disengagement, and means to support and prevent disengagement of the rod by movement in a downward or a sidewise direction.

7. A bracket, adapted to receive the end of a rod, comprising a socket having a semicircular supporting member extending therefrom, and having means in the top of said socket to engage coöperating means on the rod to prevent removal of the rod therefrom in an outward direction.

8. A bracket adapted to receive the end of a rod comprising a socket having a semicircular, supporting member extending therefrom and having means in the top of said socket to engage a rod to prevent removal therefrom in an outward direction, in combination with a rod having means adjacent its end to engage said first-named means when the parts are in assembled position.

9. A bracket adapted to receive the end of a rod and comprising a plate having an opening therein the edges of which are extended to form a broad bearing surface, and a socket in said opening provided with a bead to engage one of said edges and held in position by enlarging the end of said socket about the other of said edges.

10. A rod supporting bracket comprising a member adapted to interlock with the top side of the end of the rod supported thereby and forming a pivot about which said rod and said bracket have relative movement during engagement and disengagement, and means adapted to support the under-side of the rod comprising a part beneath said interlocking member and a part engaging the under side of the rod in advance of said interlocking member.

In testimony that I claim the foregoing I have hereunto set my hand.

JOHN KRODER.

Witnesses:
MARIAN I. DEMPSEY,
V. G. LLOYD.